(12) United States Patent
Ohnishi

(10) Patent No.: US 9,801,151 B2
(45) Date of Patent: Oct. 24, 2017

(54) SERVER APPARATUS AND COMMUNICATION CONTROL METHOD

(71) Applicant: FUJITSU LIMITED, Kawasaki-shi, Kanagawa (JP)

(72) Inventor: Yoshiaki Ohnishi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 431 days.

(21) Appl. No.: 14/147,901

(22) Filed: Jan. 6, 2014

(65) Prior Publication Data

US 2014/0120914 A1    May 1, 2014

Related U.S. Application Data

(63) Continuation of application No. PCT/JP2011/066762, filed on Jul. 22, 2011.

(51) Int. Cl.
*H04W 60/00*    (2009.01)
*H04W 8/24*    (2009.01)

(52) U.S. Cl.
CPC ............ *H04W 60/005* (2013.01); *H04W 8/24* (2013.01)

(58) Field of Classification Search
CPC . H04W 84/045; H04W 12/06; H04W 88/085; H04W 76/02; H04W 60/04; H04W 80/10; H04W 88/06; H04W 8/06; H04W 92/02; H04W 88/16; H04W 36/0011; H04W 36/14; H04W 36/24; H04W 36/32;
(Continued)

(56) References Cited

U.S. PATENT DOCUMENTS 8,098,627 B2    1/2012 Dutta et al.
2003/0225900 A1    12/2003 Morishige et al.
(Continued)

FOREIGN PATENT DOCUMENTS

JP    2003-348131 A    12/2003
JP    2008-072687 A    3/2008
(Continued)

OTHER PUBLICATIONS

International Search Report, mailed in connection with PCT/JP2011/066762 and dated Aug. 23, 2011.

*Primary Examiner* — Walter Divito
*Assistant Examiner* — Natasha W Cosme
(74) *Attorney, Agent, or Firm* — Fujitsu Patent Center

(57) ABSTRACT

A server apparatus includes a receiving unit that receives a location registration signal from a mobile wireless device, a determining unit that determines whether the mobile wireless device is a model compliant with only a first communication standard or a model compliant with both of the first communication standard and a second communication standard, based on the identification information contained in the location registration signal, and a location registration processing unit that causes a server configured to perform a process using a first Internet protocol to perform a location registration process when the mobile wireless device is the model compliant with only the first communication standard, and causes a server configured to perform a process using a second Internet protocol to perform the location registration process when the mobile wireless device is the model compliant with both of the first communication standard and the second communication standard.

6 Claims, 12 Drawing Sheets

(58) Field of Classification Search
CPC ..... H04W 48/08; H04W 4/008; H04W 4/021; H04W 4/16
USPC .............................. 455/435.2; 370/352, 389
See application file for complete search history.

(56) References Cited

U.S. PATENT DOCUMENTS

| | | | |
|---|---|---|---|
| 2006/0095585 A1* | 5/2006 | Meijs | H04L 12/4633 709/245 |
| 2007/0195755 A1* | 8/2007 | Li | H04L 29/06027 370/352 |
| 2008/0216167 A1 | 9/2008 | Imai et al. | |
| 2009/0316684 A1* | 12/2009 | Buckley | H04L 29/12349 370/352 |
| 2012/0039312 A1* | 2/2012 | Narkar | H04W 8/00 370/338 |
| 2012/0082136 A1 | 4/2012 | Dutta et al. | |
| 2012/0082158 A1* | 4/2012 | Reddy | H04W 80/045 370/389 |
| 2012/0166621 A1* | 6/2012 | Sharma | H04L 41/042 709/224 |

FOREIGN PATENT DOCUMENTS

| | | |
|---|---|---|
| JP | 2008-219436 A | 9/2008 |
| JP | 2010-206248 A | 9/2010 |
| JP | 2011-029689 A | 2/2011 |

* cited by examiner

FIG.6

| USER (822) | I-CSCF ADDRESS (824) | I-CSCF IP VERSION (826) |
|---|---|---|
| AA | IPv4 ADDRESS A | IPv4 |
| BB | IPv4 ADDRESS B | IPv4 |
| CC | IPv6 ADDRESS L | IPv6 |
| DD | IPv6 ADDRESS M | IPv6 |

FIG.7

| MODEL-SPECIFIC INFORMATION (802) | DEVICE TYPE (804) |
|---|---|
| AAAAAA | 3G DEVICE |
| AAAAAB | 3G/3.9G DUAL DEVICE |
| BBBBBB | 3G DEVICE |
| BBBCCC | 3G DEVICE |
| BBCCDD | 3G/3.9G DUAL DEVICE |

| SERVER NAME | IP ADDRESS |
|---|---|
| I-CSCF (IPv4) | IPv4 ADDRESS A |
|  | IPv4 ADDRESS B |
| I-CSCF (IPv6) | IPv6 ADDRESS L |
|  | IPv6 ADDRESS M |
| IP CONVERTING UNIT | IPv4 ADDRESS X |
|  | IPv4 ADDRESS Y |

FIG.10

```
REGISTER sip: ims.mnc010.mcc440.3gppnetwork.org SIP/2.0
Via: SIP/2.0/UDP aa.aa.aa.aa:5060;branch=z9hG4bK2vuilpu02e8fh6587wnz57
From: <sip:440xxxxxxxxxxxx@ims.mnc010.mcc440.3gppnetwork.org>;
tag=hatsu_ue_1000
To: <sip:440xxxxxxxxxxxx@ims.mnc010.mcc440.3gppnetwork.org>
Max-Forwards: 70
Contact: <sip:aa.aa.aa.aa:5060>;
+sip.instance="<urn:gsma:imeisv:AAAAAAAA-BBBBBB-CC>";
audio;methods="INVITE,CANCEL,ACK,BYE,OPTIONS,NOTIFY,
PRACK,UPDATE,MESSAGE";expires=3600
Authorization: Digest username=
"440xxxxxxxxxxxx@ims.mnc010.mcc440.3gppnetwork.org",
realm="ims.mnc010.mcc440.3gppnetwork.org", nonce="",
uri="sip:ims.mnc010.mcc440.3gppnetwork.org", response=""
Call-ID: xxxxxxxxxx@yy.yy.yy.yy
CSeq: 1 REGISTER
Supported: path
Route: <sip:bb.bb.bb.bb;lr>
Content-Length: 0
```

FIG.11

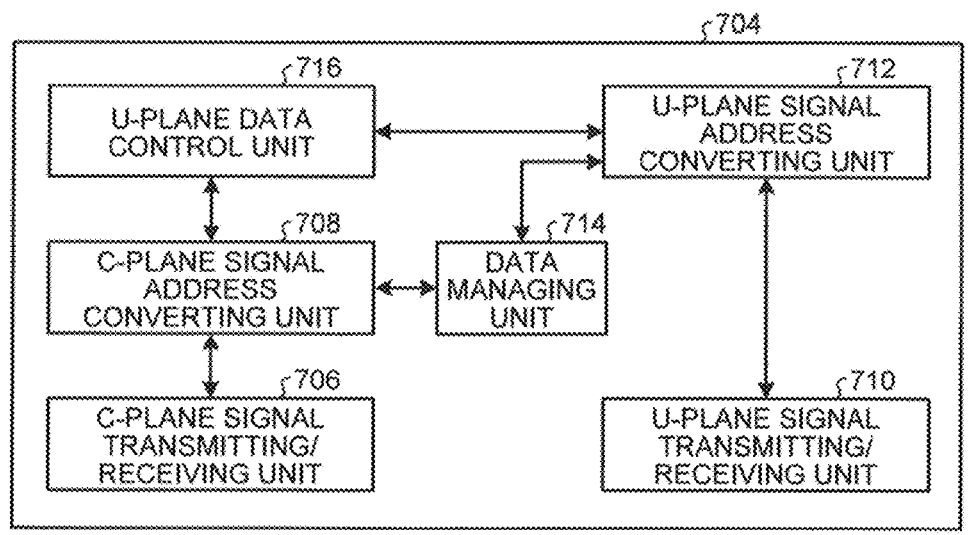

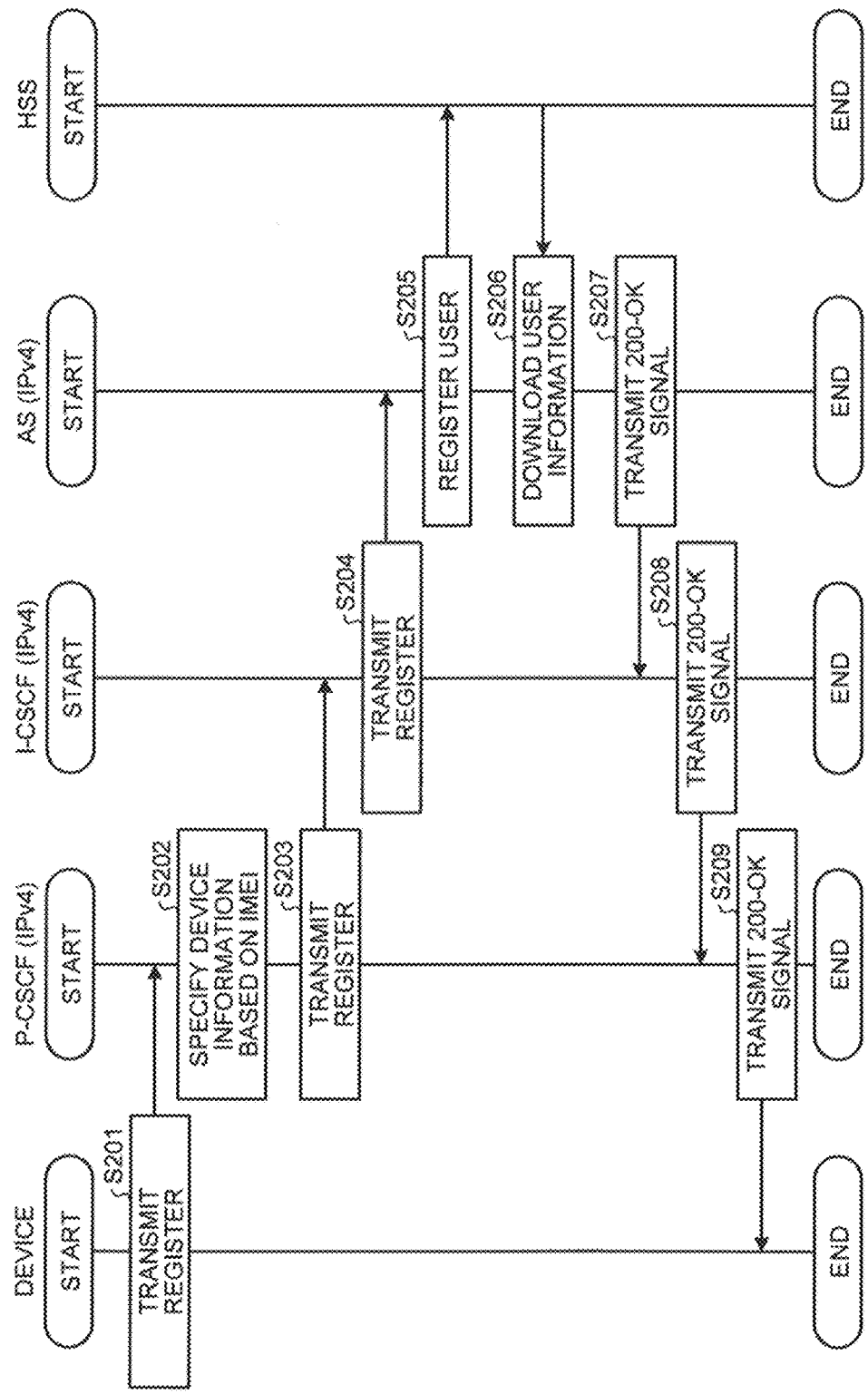

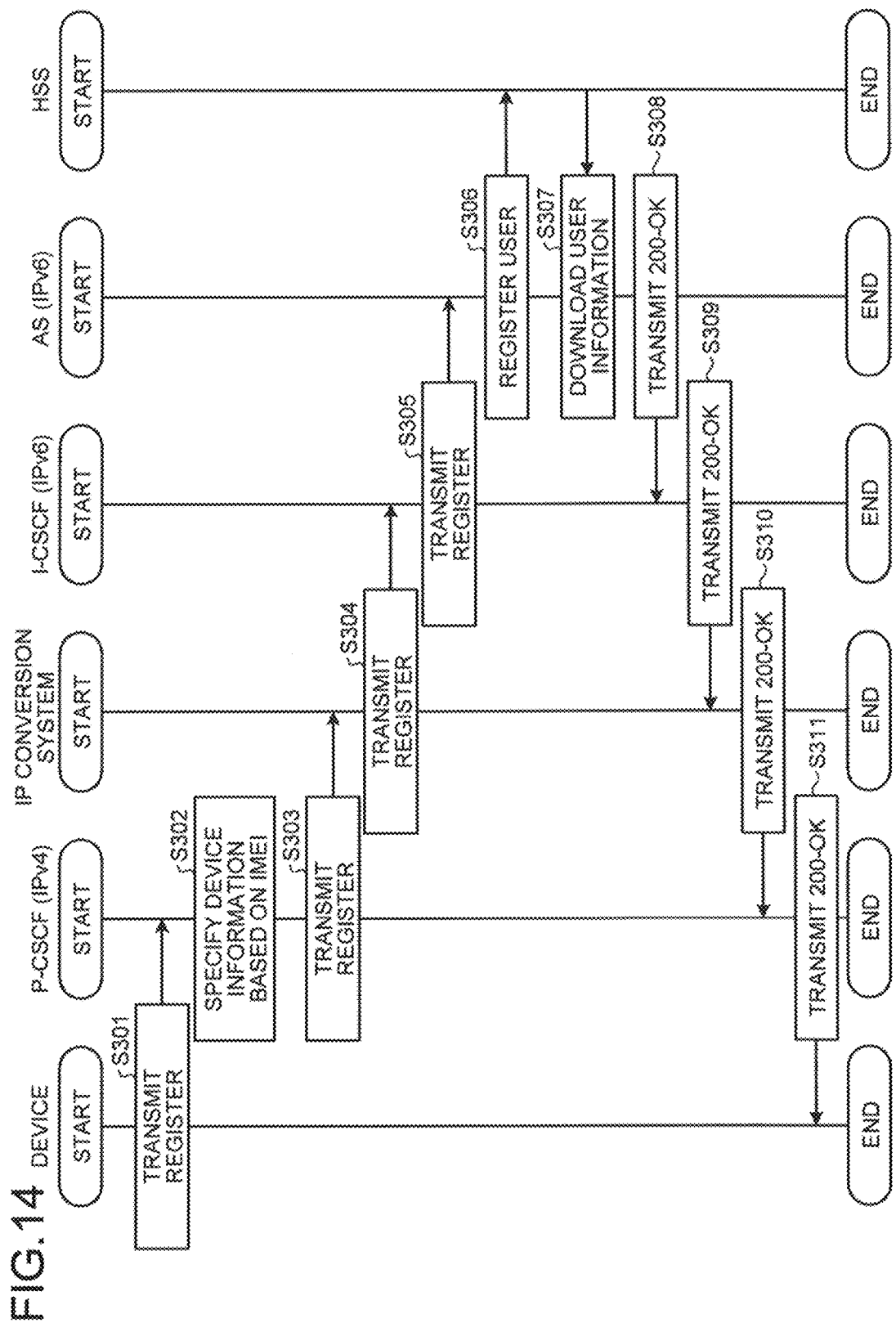

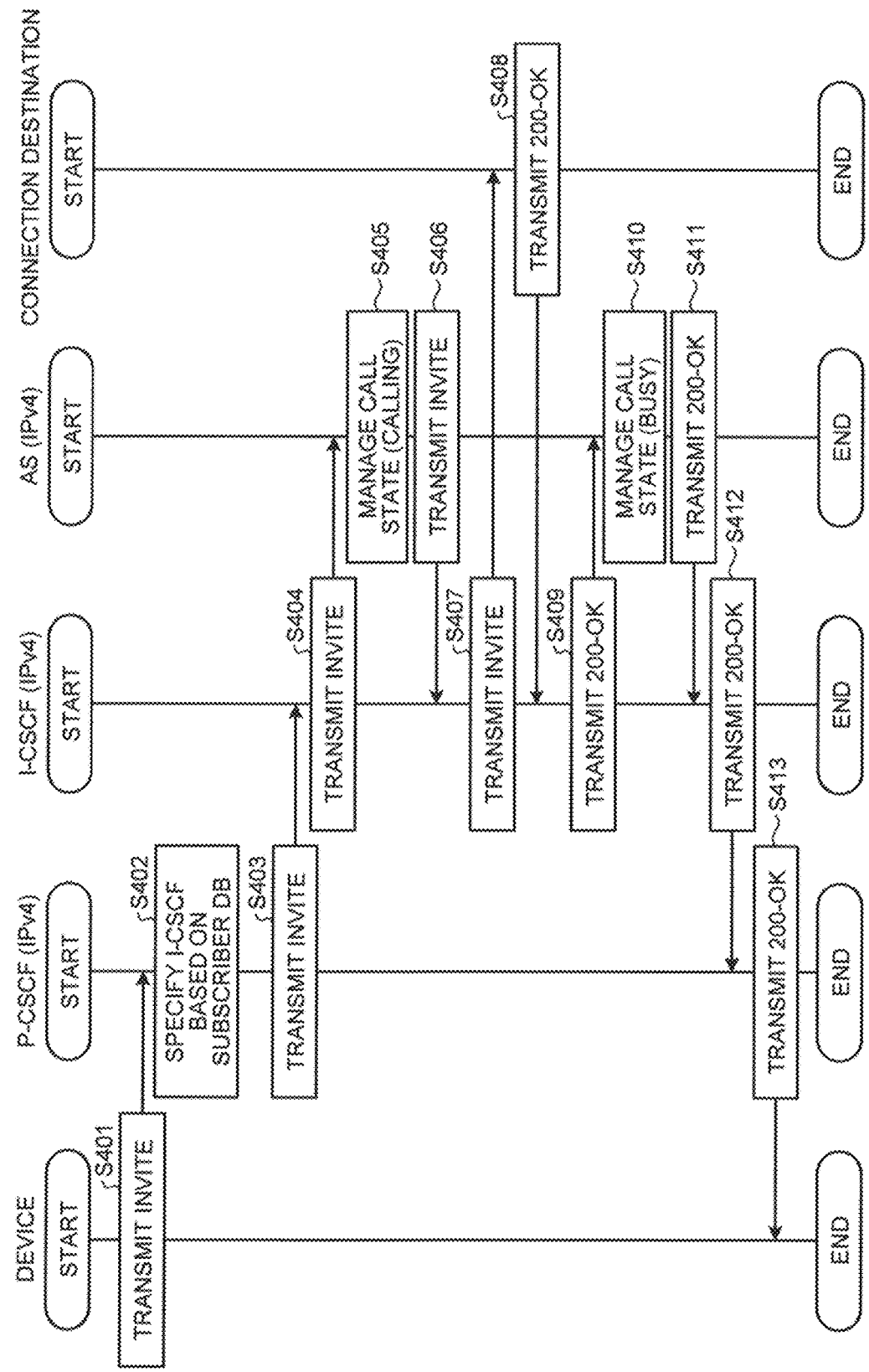

FIG.16

```
INVITE sip:P-CSCF ADDRESS:5060 SIP/2.0
Via: SIP/2.0/UDP DEVICE ADDRESS:5060;branch=z9hG4bK_invite
Route: <sip:PCSCF ADDRESS:5060;lr>
Max-Forwards: 70
From: "Anonymous" <sip:anonymous@anonymous.invarid>;tag=xxxxxxx
To: <sip:090xxxxxxxx@CONNECTION DOMAIN>
Call-ID: DEVICE call-id@DEVICE ADDRESS
CSeq: 1 INVITE
Contact: <sip:DEVICE ADDRESS:5060>
Allow: INVITE,ACK,OPTIONS,BYE,CANCEL,PRACK,UPDATE
Accept: application/sdp
Session-Expires: 300;refresher=uac;
Proxy-Require: privacy
Supported: 100rel, timer
MIN-SE: 300
P-Asserted-Identity: <sip:anonymous@anonymous.invalid;cpc=ordinary>
P-Called-Party-ID: <sip:090xxxxxxxx@CONNECTION DOMAIN>
Privacy: id
Content-Type: application/sdp
Content-Length: xxx v=0
o=- AA BB IN IP4 DEVICE ADDRESS
s=-
c=IN IP4 DEVICE ADDRESS
t=0 0
m=audio CCCCCCC RTP/AVP 0
a=rtpmap:0 PCMU/8000
```

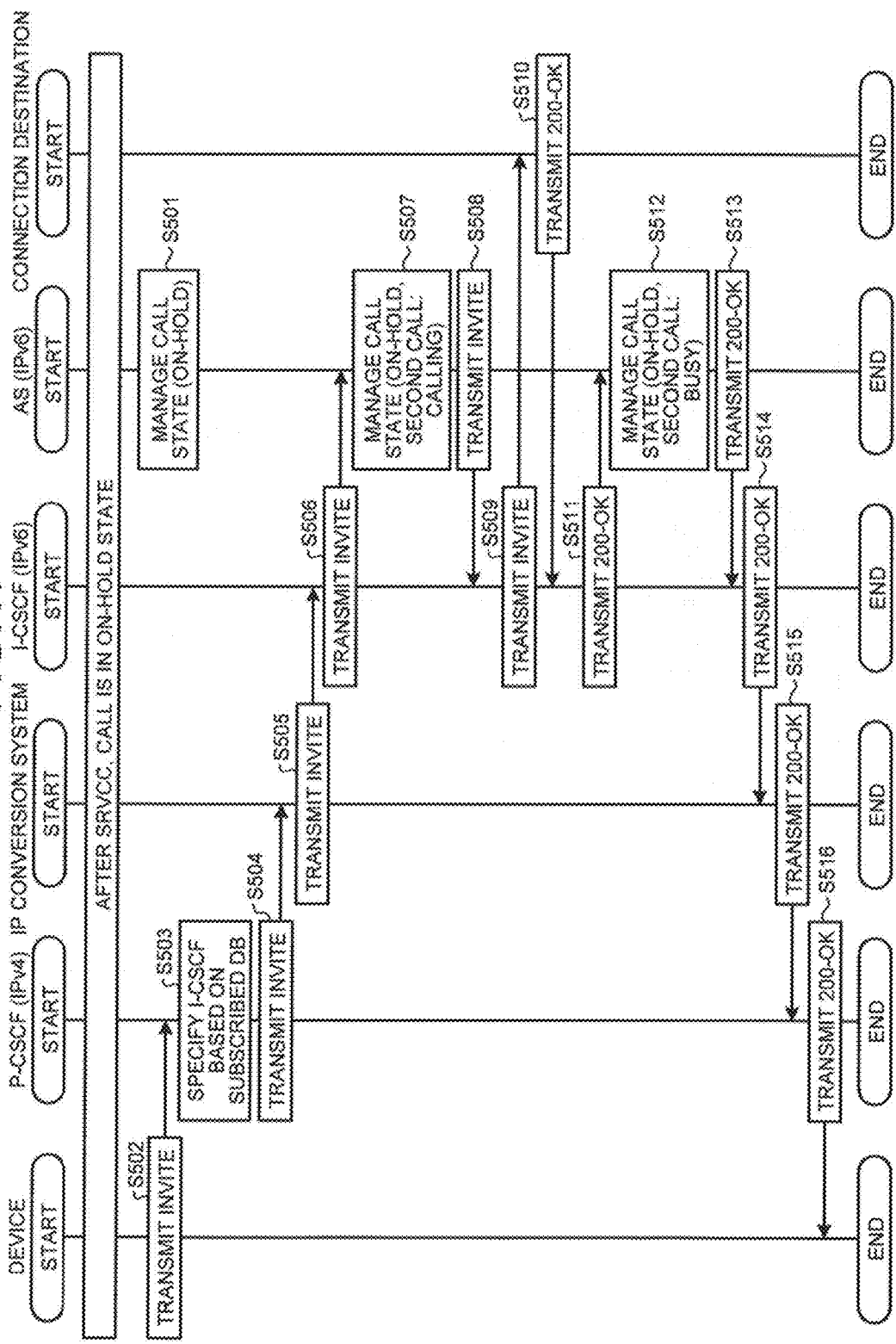

SERVER APPARATUS AND COMMUNICATION CONTROL METHOD

CROSS-REFERENCE TO RELATED APPLICATION

This application is a continuation of International Application No. PCT/JP2011/066762, filed on Jul. 22, 2011, and designating the U.S., the entire contents of which are incorporated herein by reference.

FIELD

The embodiment discussed herein is related to a server apparatus and a communication control method.

BACKGROUND

In conventional Internet protocol (IP) phone systems, a session initiation protocol (SIP) has widely been used. The SIP is a communication protocol used to establish sessions between multiple mobile wireless devices, such as mobile phones.

Furthermore, as for the architecture of an IP core system for mobile phone systems, an IP multimedia subsystem (IMS) is defined in the 3rd generation partnership project (3GPP: the 3rd generation mobile communication system). The IMS is used as an IP core network architecture for voice communication based on the international mobile telecommunications (IMT)-2000 standard being a wireless communication network standard for 3G services, or for voice communication based on the long term evolution (LTE) standard for 3.9G services.

Moreover, a transition from the 3G services to the 3.9G services is currently in progress, and enhancements to wireless communication networks are also in progress. Therefore, a system called single radio voice call continuity (SRVCC) has been established that performs handover from an existing wireless communication network (for example, a 3G network) to a new wireless communication network (for example, a 3.9G network) to compensate for a narrow area of the new wireless communication network.

Specifically, when a voice call service based on the new wireless standard (for example, 3.9G) is to be provided, it is difficult to establish wireless communication networks that cover the whole country at the beginning of the service. Therefore, the service is started in a limited area in the early period and the area is gradually expanded.

Incidentally, because a wireless area corresponding to the new wireless standard is narrow in the early period, if a dual device that can cope with both of the new wireless standard and the existing wireless standard moves to the outside of the area of a new wireless standard network, handover to an existing wireless standard network is performed. Therefore, a voice service can be continued over a wide range, so that the narrow wireless area corresponding to the new wireless standard may be compensated for without reducing the convenience of the service.

Patent Document 1: Japanese Laid-open Patent Publication No. 2008-219436

However, in the conventional technologies, a technology is not taken into account, which centrally manages a call state of the dual device by using a simple structure with minimum modifications to the functions used in the existing wireless communication network.

Specifically, a case will be described below that an existing wireless standard service (for example, a 3G service) is adapted to an IMS network including multiple servers that perform processes using Internet protocol version 4 (IPv4) addresses. In this case, if a new wireless standard service (for example, a 3.9G service) is to be introduced, because IPv4 IP addresses are being depleted, it is expected to establish the new wireless standard service by an IP network using IPv6 addresses.

In this case, it is assumed that, when the IP version differs between the IPv4 IMS network and the IPv6 IMS network as described above, a dual device starts voice communication while being located in the area of the IPv6 IMS network and thereafter moves to the IPv4 IMS network, and the SRVCC is performed. In this case, because the IMS network controlling a call due to the voice communication is the IPv6 network, the dual device may continue to access the IPv6 IMS network via an address conversion system that converts IP versions even after the dual device has moved to the IPv4 IMS network.

In contrast, if a second call due to call waiting (CW) or the like is performed after the SRVCC, the second call from the 3G network is performed over the IPv4 IMS network. Therefore, the first call is managed in the IPv6 IMS network while the second call is managed in the IPv4 IMS network. Consequently, in some cases, it may become difficult to determine the call state, such as an incoming call (or a busy state).

Incidentally, if an application server (AS) in the IPv4 IMS network and an AS in the IPv6 IMS network cooperate with each other so that the ASs can mutually refer to the call state, it may become possible to centrally manage the call state. However, if a certain function is added to the server, such as the AS, in the IPv4 IMS network, communication failures or the like may occur with respect to existing users using the IPv4 IMS network.

Therefore, it is preferable to centrally manage the call state of a dual device by using a simple structure with minimum modifications to servers in the IPv4 IMS network.

SUMMARY

According to an aspect of an embodiment, a server apparatus includes: a receiving unit that receives a location registration signal from a mobile wireless device, the location registration signal containing identification information unique to the mobile wireless device and being transmitted to register location information on the mobile wireless device; a determining unit that determines whether the mobile wireless device transmitting the location registration signal is a model compliant with only a first communication standard or a model compliant with both of the first communication standard and a second communication standard, based on the identification information contained in the location registration signal received by the receiving unit; and a location registration processing unit that causes a server configured to perform a process using a first Internet protocol to perform a location registration process based on the location registration signal when the determining unit determines that the mobile wireless device transmitting the location registration signal is the model compliant with only the first communication standard, and causes a server configured to perform a process using a second Internet protocol to perform the location registration process based on the location registration signal when the determining unit determines that the mobile wireless device transmitting the location registration signal is the model compliant with both of the first communication standard and the second communication standard.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating functional blocks of an AS;

FIG. 6 is a diagram illustrating an example of a subscriber DB;

FIG. 7 is a diagram illustrating an example of a device information DB;

FIG. 10 is a diagram for explaining an image of an SIP Register signal;

FIG. 11 is a diagram illustrating functional blocks of an IP converting unit;

FIG. 13 is a diagram illustrating a sequence of a location registration process performed by a 3G device;

FIG. 14 is a diagram illustrating a sequence of a location registration process performed by a 3G/3.9G device;

FIG. 15 is a diagram illustrating a sequence of an outgoing call process performed by the 3G device;

FIG. 16 is a diagram for explaining an image of an SIP INVITE signal; and

FIG. 17 is a diagram illustrating a sequence of a second outgoing call performed by the 3G/3.9G device.

DESCRIPTION OF EMBODIMENT

Preferred embodiments of the present invention will be explained with reference to accompanying drawings.

The disclosed invention is not limited to the embodiment below.

Figure 1:
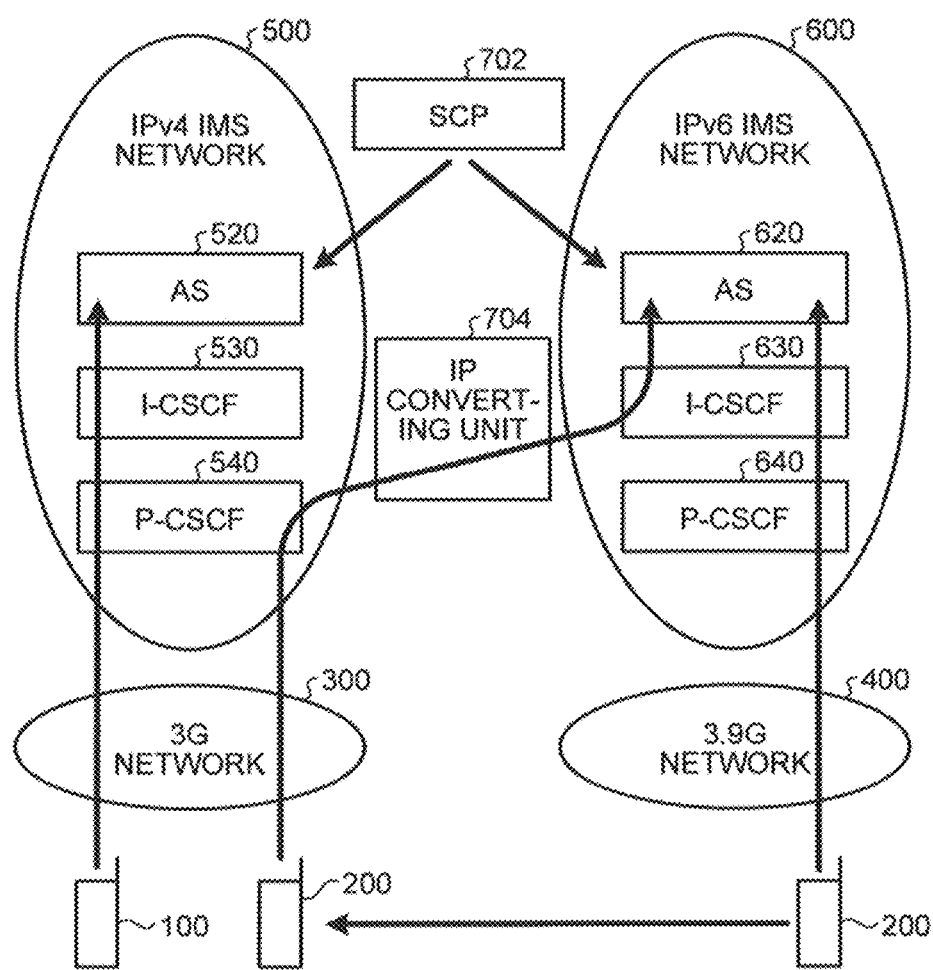
FIG. 1 is a diagram for explaining an overview of a wireless system according to an embodiment.

FIG. 1 is a diagram for explaining an overview of a wireless system according to an embodiment. As illustrated in FIG. 1, in the embodiment, a 3G network 300 based on an existing wireless standard is compatible with an IPv4 IMS network 500, and a 3.9G network 400 based on a new wireless communication standard is compatible with an IPv6 IMS network 600.

The IPv4 IMS network 500 includes a server group of an AS 520, an interrogating-call session control function (I-CSCF) 530, and a proxy call session control function (P-CSCF) 540. The IPv6 IMS network 600 includes a server group of an AS 620, an I-CSCF 630, and a P-CSCF 640. The ASs 520 and 620, the I-CSCFs 530 and 630, and the P-CSCFs 540 and 640 will be described in detail later.

Furthermore, in the embodiment, as illustrated in FIG. 1, it is assumed that a mobile phone 100 compliant with only the 3G communication standard and a mobile phone 200 compliant with both of the 3G communication standard and the 3.9G communication standard are used. Communications, such as a voice call, by the mobile phone 100 located in the area of the 3G network 300 is processed by the servers in the IPv4 IMS network 500. In contrast, communications, such as a voice call, by the mobile phone 200 located in the area of the 3.9G network 400 is processed by the servers in the IPv6 IMS network 600.

If the mobile phone 200 moves from the 3.9G network 400 to the 3G network 300, handover from the 3.9G network 400 to the 3G network 300 is performed. In this case, a location registration signal for registering a location of the mobile phone 200 for which the handover has been performed is transmitted from the mobile phone 200 to the P-CSCF 540 in the IPv4 IMS network 500. Accordingly, the P-CSCF 540 determines whether the mobile phone 200 that has transmitted the location registration signal is a single model compliant with only the 3G communication standard or a dual model compliant with both of the 3G communication standard and the 3.9G communication standard, based on identification information, which is unique to the mobile phone and which is contained in the location registration signal. In this example, the P-CSCF 540 determines that the mobile phone 200 that has transmitted the location registration signal is the dual model, and causes the I-CSCF 630 and the AS 620 in the IPv6 IMS network 600 to perform a location registration process via an IP converting unit 704. For example, the AS 620 downloads user information from an SCP 702 that manages the user information (authentication information or user service information) and location information on a subscriber.

Figure 2:
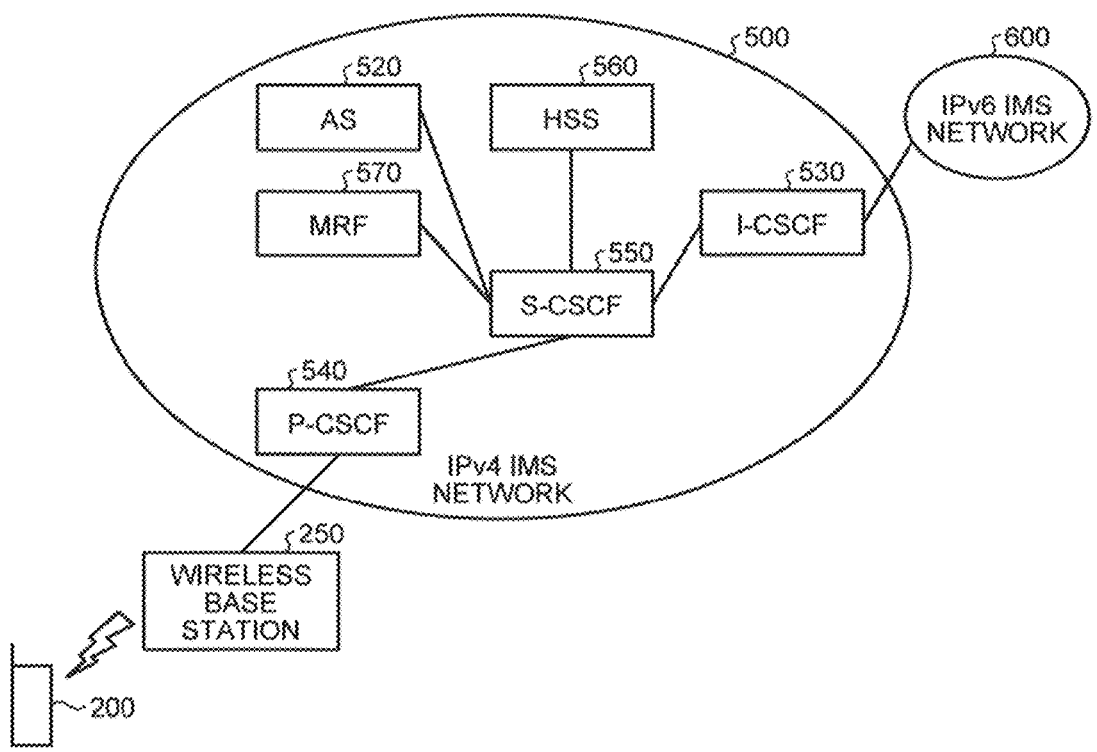
FIG. 2 is a diagram illustrating an overall configuration of an IMS system.

FIG. 2 is a diagram illustrating an overall configuration of an IMS system. In FIG. 2, the IPv4 IMS network 500 is illustrated as an example for explanation. As illustrated in FIG. 2, the IPv4 IMS network 500 includes a server group of the AS 520, the I-CSCF 530, the P-CSCF 540, and a serving-call session control function (S-CSCF) 550. Furthermore, the IPv4 IMS network 500 includes a server group of a home subscriber server (HSS) 560 and a multimedia resource function (MRF) 570. While the server groups included in the IPv4 IMS network 500 will be explained below with reference to FIG. 2, the IPv6 IMS network 600 includes the same server groups as those illustrated in FIG. 2.

The AS 520 has a function to download various types of information (authentication information or user service information) on users who use the mobile phones 100 and 200 from the HSS 560. The I-CSCF 530 has a function to distribute SIP requests to appropriate destinations. The AS 520 and the I-CSCF 530 will be described in detail later.

The P-CSCF 540 is deployed at the entrance of the IMS network, and performs a process related to location registration based on the location registration signal transmitted by the mobile phone 200 via a wireless base station 250. The P-CSCF 540 will be described in detail later.

The S-CSCF 550 is an SIP server and controls sessions. Furthermore, the S-CSCF 550 instructs the HSS 560 to download or upload various types of user information. The S-CSCF 550 will be described in detail later.

The HSS 560 manages various types of information on users who use the mobile phones 100 and 200 and location information on the mobile phones 100 and 200. The MRF 570 provides media-related functions, such as media operation (for example, synthesis of voice streams) or reproduction of tone or announcement.

Figure 3:
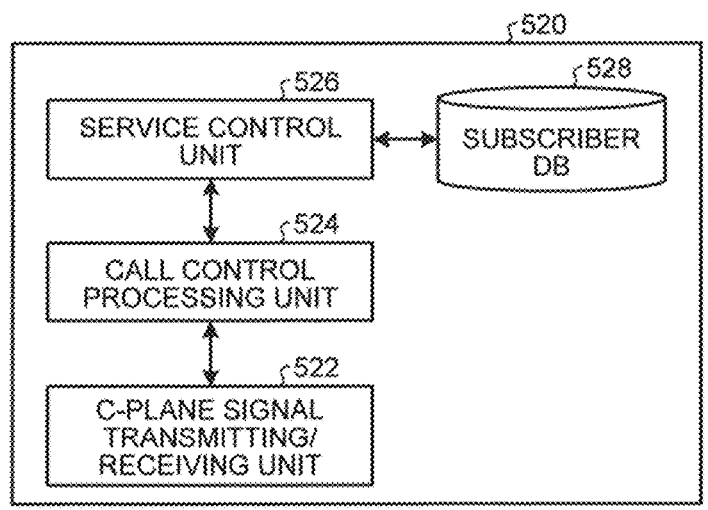

FIG. 3 is a diagram illustrating functional blocks of the AS. As illustrated in FIG. 3, the AS 520 includes a C-Plane signal transmitting/receiving unit 522, a call control processing unit 524, a service control unit 526, and a subscriber DB 528.

The C-Plane signal transmitting/receiving unit 522 transmits and receives a C-Plane signal, which is used to exchange information on call control, to and from the S-CSCF 550. The call control processing unit 524 performs a call control process based on the C-Plane signal received by the C-Plane signal transmitting/receiving unit 522. The call control processing unit 524 manages a call state by, for example, switching the call state (calling, busy, on-hold, etc.) of the mobile phone 100. The service control unit 526 performs a process of registering the location information on the mobile phone 100 in the HSS 560, or a process of downloading the user information from the HSS 560 and storing the user information in the subscriber DB 528.

Figure 4:
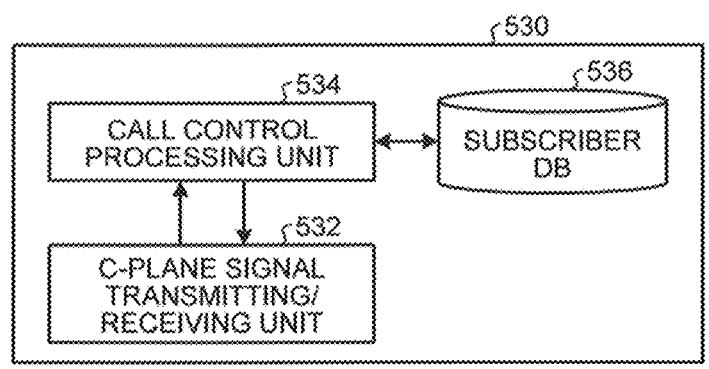
FIG. 4 is a diagram illustrating functional blocks of an I/S-CSCF.

FIG. 4 is a diagram illustrating functional blocks of the I-CSCF. Here, because functional blocks of the S-CSCF correspond to the functional blocks of the I-CSCF illustrated in FIG. 4, the functional blocks of the I-CSCF 530 will be explained in the following. As illustrated in FIG. 4, the I-CSCF 530 includes a C-Plane signal transmitting/receiving unit 532, a call control processing unit 534, and a subscriber DB 536.

The C-Plane signal transmitting/receiving unit 532 transmits and receives a C-Plane signal, which is used to exchange information on call control, to and from the AS 520, the P-CSCF 540, the HSS 560, and the MRF 570 that are neighboring devices. The call control processing unit 534 instructs the HSS 560 to upload various types of user information, and downloads the various types of user information from the HSS 560 and then stores the various types of user information in the subscriber DB 536.

Figure 5:
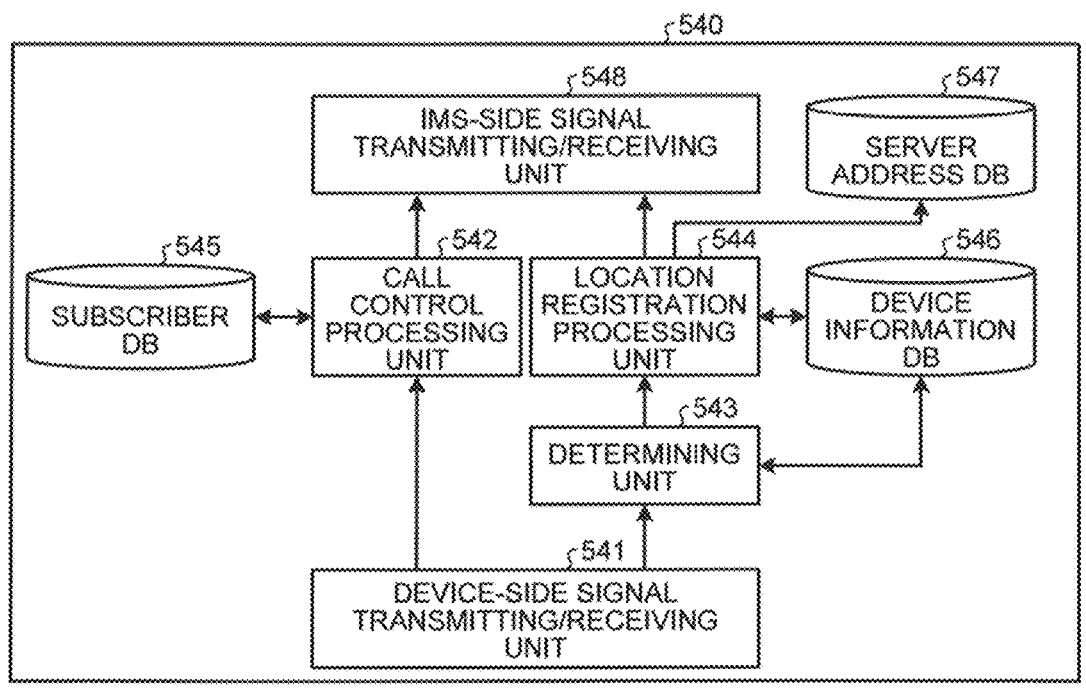
FIG. 5 is a diagram illustrating functional blocks of a P-CSCF.

FIG. 5 is a diagram illustrating functional blocks of the P-CSCF. As illustrated in FIG. 5, the P-CSCF 540 includes a device-side signal transmitting/receiving unit 541, a call control processing unit 542, a determining unit 543, a location registration processing unit 544, a subscriber DB 545, a device information DB 546, a server address DB 547, and an IMS-side signal transmitting/receiving unit 548.

The device-side signal transmitting/receiving unit 541 transmits and receives various signals, such as a location registration signal containing identification number (international mobile equipment identity: IMEI) unique to each of the mobile phones 100 and 200, to and from the mobile phones 100 and 200 via the wireless base station 250. Meanwhile, for mobile phones, such as GSM/W-CDMA phones, an international mobile equipment identity called IMEI is notified at the time the location is registered. The IMEI is a number assigned for each device model, and contains a model-specific number and a serial number. The call control processing unit 542 performs a call connection process on the mobile phones 100 and 200 by referring to the subscriber DB 545 that stores therein I-CSCF information used to connect a call. The call control processing unit 542 outputs a result of the call connection process to the IMS-side signal transmitting/receiving unit 548.

The subscriber DB 545 will be described in detail below. FIG. 6 is a diagram illustrating an example of the subscriber DB. As illustrated in FIG. 6, the subscriber DB 545 contains, as items, a user 822, an I-CSCF address 824, and an I-CSCF IP version 826. In the item of the user 822, a user identifier is stored. In the item of the I-CSCF address 824, the address of the I-CSCF is stored in association with the user identifier. In the item of the I-CSCF IP version 826, the IP version of the I-CSCF is stored in association with the user identifier. For example, a user AA is accommodated by an I-CSCF having an IPv4 address A. While an example is illustrated in FIG. 6 that the subscriber DB 545 contains the I-CSCF IP version 826, it may be possible to determine the IP version from the I-CSCF address 824 without providing the I-CSCF IP version 826.

Referring back to FIG. 5, the determining unit 543 determines whether the mobile wireless device that has transmitted the location registration signal is a single model or a dual model based on the identification information (IMEI) contained in the location registration signal received by the device-side signal transmitting/receiving unit 541. For example, the determining unit 543 determines whether the mobile wireless device that has transmitted the location registration signal is a single model compliant with only the 3G communication standard or a dual model compliant with both of the 3G communication standard and the 3.9G communication standard based on the identification information (IMEI). In other words, the determining unit 543 determines whether the mobile phone is a device used in only the existing wireless network (the 3G network) or a dual device used in both of the new wireless network (the 3.9G network) and the existing wireless network, based on the IMEI information. As described above, whether the mobile phone is a single device or a dual device is determined by the P-CSCF 540 deployed at the entrance of the IMS network established in the existing network.

The determining unit 543 determines whether the mobile wireless device that has transmitted the location registration signal is the single model or the dual model based on the identification information (IMEI) contained in the location registration signal received by the device-side signal transmitting/receiving unit 541 and based on the device information DB 546.

The device information DB 546 will be described in detail below. FIG. 7 is a diagram illustrating an example of the device information DB. As illustrated in FIG. 7, the device information DB 546 contains, as items, a model-specific information 802 and a device type 804. In the item of the model-specific information 802, information corresponding to the identification information (IMEI) contained in the location registration signal transmitted by the mobile phone 100 or 200 is stored. In the item of the device type 804, information "3G device" indicating a model compliant with only the 3G communication standard or information "3G/3.9G dual device" indicating a model compliant with both of the 3G and the 3.9G communication standards is stored. For example, a mobile phone with the model-specific information 802 of "AAAAAA" is associated with the information "3G device", and a mobile phone with the model-specific information 802 of "AAAAAB" is associated with the information "3G/3.9G dual device".

Referring back to FIG. 5, if the determining unit 543 determines that the mobile wireless device that has transmitted the location registration signal is the model compliant with only the 3G communication standard, the location registration processing unit 544 causes a server configured to perform processes using IPv4 to perform a location registration process based on the location registration signal. For example, the location registration processing unit 544 causes the I-CSCF 530 and the AS 520 based on IPv4 to perform the location registration process.

In contrast, if the determining unit 543 determines that the mobile wireless device that has transmitted the location registration signal is the model compliant with both of the 3G and the 3.9G communication standards, the location registration processing unit 544 causes a server configured to perform a process using IPv6 to perform the location registration process based on the location registration signal. For example, the location registration processing unit 544 causes the I-CSCF 630 and the AS 620 based on IPv6 to perform the location registration process.

When causing the IPv4 server or the IPv6 server to perform the location registration process, the location registration processing unit 544 confirms a destination of the location registration signal by referring to the server address DB 547, and transmits the location registration signal to the IMS-side signal transmitting/receiving unit 548.

Figures 8, 9:
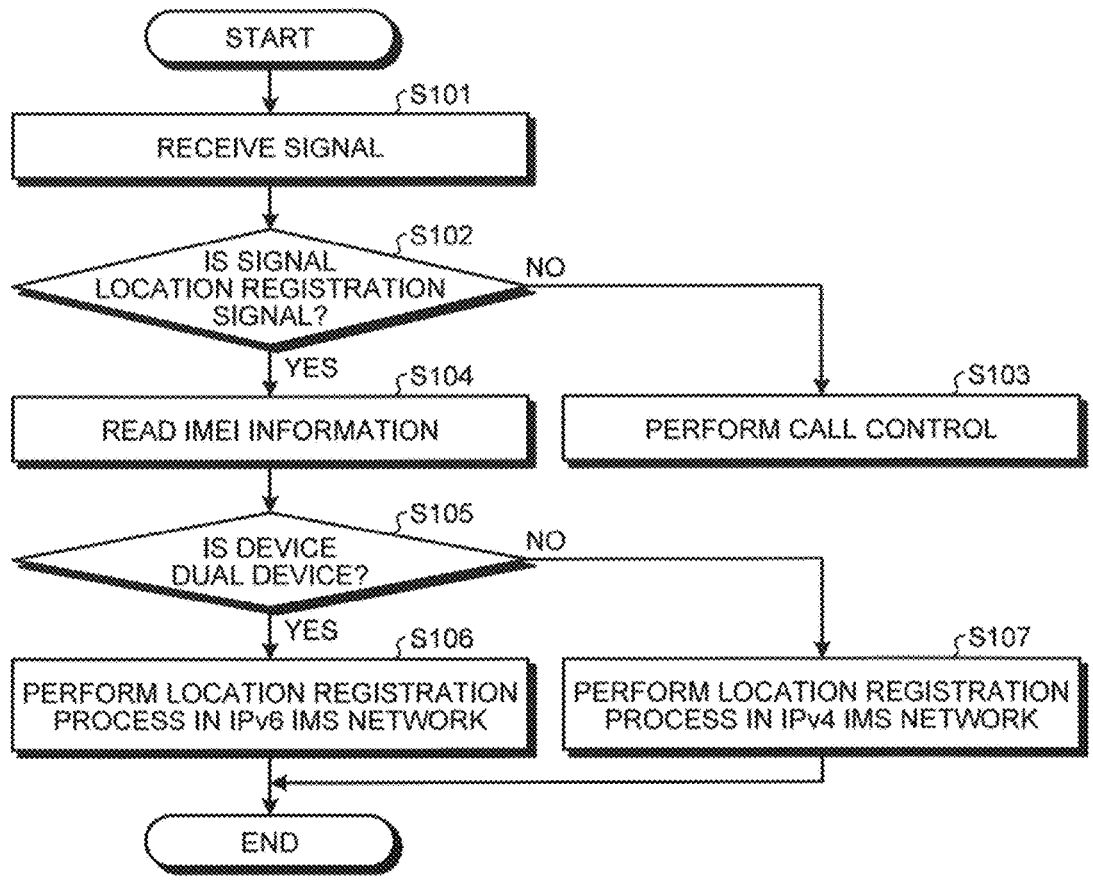
FIG. 8 is a diagram illustrating an example of a server address DB.
FIG. 9 is a diagram illustrating the flow of a location registration process performed by the P-CSCF.

The server address DB 547 will be described in detail below. FIG. 8 is a diagram illustrating an example of the server address DB. As illustrated in FIG. 8, the server address DB 547 contains, as items, a server name 812 and an IP address 814. In the item of the server name 812, a server name, such as an I-CSCF (IPv4), an I-CSCF (IPv6), or an IP converting unit, is stored. In the item of the IP address 814, an IP address, such as an IPv4 address A or an IPv4 address B, is stored. For example, if the server name of a destination is the I-CSCF (IPv4), a single address is selected from the IPv4 address A and the IPv4 address B by round robin or the like, and the location registration signal is transmitted to the selected address.

Referring back to FIG. 5, the IMS-side signal transmitting/receiving unit 548 transmits, for example, a Register signal for registering a location and an INVITE signal that is an outgoing call signal from the mobile phone 100 or 200 to the I-CSCF 530 or the like via the S-CSCF 550. Furthermore, the IMS-side signal transmitting/receiving unit 548 receives a signal transmitted by, for example, the I-CSCF 530 via the S-CSCF 550.

The location registration process performed by the P-CSCF 540 will be explained below. FIG. 9 is a diagram illustrating the flow of the location registration process performed by the P-CSCF 540. The device-side signal transmitting/receiving unit 541 receives a signal transmitted by the mobile phone 100 or 200 (Step S101). Subsequently, the device-side signal transmitting/receiving unit 541 determines whether the received signal is a location registration signal, that is, whether the received signal is a Register signal (Step S102).

The Register signal will be explained below. FIG. 10 is a diagram for explaining an image of an SIP Register signal. The Register signal is defined as illustrated in FIG. 10 for example. Furthermore, as illustrated in FIG. 10, imeisoftwareversion (imeisv) is set in the Register signal.

Referring back to FIG. 9, if it is determined that the received signal is not the location registration signal (NO at Step S102), the call control processing unit 542 performs a call control process (Step S103). In contrast, if it is determined that the received signal is the location registration signal (YES at Step S102), the determining unit 543 reads IMEI information contained in the Register signal (Step S104).

Subsequently, the determining unit 543 determines whether the mobile phone that has transmitted the Register signal is a dual device based on the read IMEI information and the device information DB 546 (Step S105). If it is determined that the mobile phone that has transmitted the Register signal is the dual device (YES at Step S105), the location registration processing unit 544 causes the location registration process to be performed in the IPv6 IMS network (Step S106). For example, the location registration processing unit 544 causes the I-CSCF 630 and the AS 620 in the IPv6 IMS network 600 to perform the location registration process via the IP converting unit 704.

In contrast, if it is determined that the mobile phone that has transmitted the Register signal is not the dual device (i.e., the mobile phone is a single device) (NO at Step S105), the location registration processing unit 544 causes the location registration process to be performed in the IPv4 IMS network (Step S107). For example, the location registration processing unit 544 causes the I-CSCF 530 and the AS 520 in the IPv4 IMS network 500 to perform the location registration process.

As described above, the P-CSCF 540 causes the existing IMS network (IPv4) to download the user information (the authentication information or the user service information) when the mobile phone is the single model. In contrast, the P-CSCF 540 causes the new IMS network (IPv6) to download the user information when the mobile phone is the dual model. Therefore, it is possible to centrally manage the information on the user who has a dual device in the new IMS network (IPv6) side, regardless of the area where the dual device is located.

The IP converting unit 704 will be described in detail below. FIG. 11 is a diagram illustrating functional blocks of the IP converting unit 704. As illustrated in FIG. 11, the IP converting unit 704 includes a C-Plane signal transmitting/receiving unit 706, a C-Plane signal address converting unit 708, a U-Plane signal transmitting/receiving unit 710, a U-Plane signal address converting unit 712, a data managing unit 714, and a U-Plane data control unit 716.

The C-Plane signal transmitting/receiving unit 706 transmits and receives, for example, a C-Plane signal, which is used to exchange information on call control, to and from the P-CSCF 540 based on IPv4 and the I-CSCF 630 based on IPv6. The C-Plane signal address converting unit 708 performs a process of converting the IP version of the C-Plane signal received by the C-Plane signal transmitting/receiving unit 706 between IPv4 and IPv6.

The U-Plane signal transmitting/receiving unit 710 transmits and receives, for example, a U-Plane signal, which is used to exchange user information such as voice, to and from the P-CSCF 540 based on IPv4 and the I-CSCF 630 based on IPv6. The U-Plane signal address converting unit 712 performs a process of converting the IP version of the U-Plane signal received by the U-Plane signal transmitting/receiving unit 710 between IPv4 and IPv6.

The data managing unit 714 manages data related to conversion of the IP version performed by the C-Plane signal address converting unit 708 and the U-Plane signal address converting unit 712. The U-Plane data control unit 716 performs a process related to the user information received by the U-Plane signal transmitting/receiving unit 710.

Figure 12:
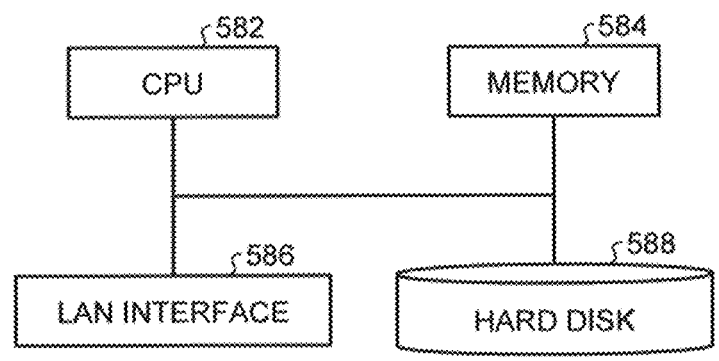
FIG. 12 is a diagram illustrating a hardware configuration of a server apparatus.

A hardware configuration of the server apparatus will be explained below. FIG. 12 is a diagram illustrating a hardware configuration of the server apparatus. The hardware configuration illustrated in FIG. 12 is common to various server apparatuses, such as the ASs 520 and 620, the I-CSCFs 530 and 630, the P-CSCFs 540 and 640, and the S-CSCF 550, included in the IPv4/IPv6 IMS networks. In the following, the hardware configuration of the P-CSCF 540 will be described by way of example.

As illustrated in FIG. 12, the P-CSCF 540 includes a central processing unit (CPU) 582, a memory 584, a local area network (LAN) interface 586, and a hard disk 588.

The CPU 582 is an arithmetic processing unit that executes various programs stored in the memory 584. The CPU 582 executes the various programs stored in the memory 584 to thereby control the device-side signal transmitting/receiving unit 541, the call control processing unit 542, the determining unit 543, the location registration processing unit 544, and the IMS-side signal transmitting/receiving unit 548 as described above. The programs executed by the CPU 582 may be recorded in a distributable recording medium, such as a compact disc (CD)-ROM or a memory medium, instead of the memory 584, and may be read and executed from the recording medium. Furthermore, the programs may be stored in a server connected via a network such that the programs can run on the server, and upon request from the P-CSCF 540 connected via the network, the programs may be provided to the P-CSCF 540 that has issued the request.

The memory 584 includes a read only memory (ROM) for storing data to implement various functions of the P-CSCF 540 and various programs to implement various functions of the P-CSCF 540. The memory 584 also includes a random access memory (RAM) for storing programs to be executed from among the various programs stored in the ROM.

The LAN interface 586 is an input/output interface for transmitting and receiving signals to and from the wireless base station 250 and the S-CSCF 550 for example. The hard disk 588 is a storage unit for storing, for example, the subscriber DB 545, the device information DB 546, and the server address DB 547 as described above. The subscriber DB 545, the device information DB 546, and the server address DB 547 may be stored in the memory 584 instead of being stored in the hard disk 588.

The details of the location registration process for the 3G device will be described below. FIG. 13 is a diagram illustrating a sequence of the location registration process for the 3G device. Specifically, FIG. 13 illustrates a sequence performed by the server apparatuses when the mobile phone 100 compliant with only the 3G communication standard performs the location registration process.

The mobile phone 100 transmits a Register signal, which contains the identification information (IMEI) unique to the mobile phone 100 and which is used to authenticate the mobile phone 100 and register the location information, to the P-CSCF (IPv4) deployed at the entrance of a 3G IMS network (Step S201).

The P-CSCF (IPv4) specifies a type of the mobile phone that has transmitted the Register signal based on the identification information (IMEI) contained in the Register signal and based on the device information DB 546 (Step S202). In this example, the P-CSCF (IPv4) determines that the mobile phone that has transmitted the Register signal is the single model compliant with only the 3G communication standard. Meanwhile, the P-CSCF (IPv4) deployed in the existing network belongs to an IPv4 IMS network that is the existing IMS network. Furthermore, the IMEI information is set in information notified by an SIP signal (Register signal) that is transmitted by the mobile phone when the location is registered. Therefore, the P-CSCF (IPv4) can determine whether the device is available in only the existing wireless network or in both of the existing and the new wireless networks by referring to the device information DB 546 based on the IMEI information.

Subsequently, the P-CSCF (IPv4) selects a single address from an address list of the E-CSCF (IPv4) contained in the server address DB 547 by round robin or the like, and transmits the Register signal to the I-CSCF (IPv4) (Step S203).

The I-CSCF (IPv4) selects an AS (IPv4) and transmits the Register signal (Step S204). The AS (IPv4) specifies an HSS (IPv4) based on the user information, registers the user (Step S205), and downloads the user information from the HSS (IPv4) (Step S206).

The AS (IPv4) transmits a 200-OK signal indicating that the request has been successfully processed to the I-CSCF (IPv4) (Step S207). Subsequently, the I-CSCF (IPv4) transmits the received 200-OK signal to the P-CSCF (IPv4) (Step S208). Then, the P-CSCF (IPv4) transmits the received 200-OK signal to the mobile phone 100 (Step S209).

The details of the location registration process for the 3G/3.9G device will be described below. FIG. 14 is a diagram illustrating a sequence of the location registration process for the 3G/3.9G device. Specifically, FIG. 14 illustrates a sequence performed by the server apparatuses when the mobile phone 200 compliant with both of the 3G communication standard and the 3.9G communication standard performs the location registration process. Furthermore, FIG. 14 illustrates a sequence performed by the server apparatuses when the mobile phone 200 is located in the 3G communication area during the location registration process.

The mobile phone 200 transmits a Register signal, which contains the identification information (IMEI) unique to the mobile phone 200 and which is used to authenticate the mobile phone 200 and register the location information, to the P-CSCF (IPv4) deployed at the entrance of the 3G IMS network (Step S301).

The P-CSCF (IPv4) specifies a type of the mobile phone that has transmitted the Register signal based on the identification information (IMEI) contained in the Register signal and based on the device information DB 546 (Step S302). In this example, the P-CSCF (IPv4) determines that the mobile phone that has transmitted the Register signal is the dual model compliant with the 3G/3.9G communication standards.

Subsequently, the P-CSCF (IPv4) selects a single address from each of an address list of the E-CSCF (IPv6) and an address list of the IP converting unit 704 contained in the server address DB 547 by round robin or the like, and transmits the Register signal to the I-CSCF (IPv6) via the IP converting unit 704 (Step S303). For example, the P-CSCF (IPv4) sets the I-CSCF (IPv6) in route information, and transmits the Register signal to the IP converting unit 704.

The IP converting unit 704 transmits the Register signal to the I-CSCF (IPv6) set in the route information (Step S304). The I-CSCF (IPv6) selects an AS (IPv6) and transmits the Register signal (Step S305). The AS (IPv6) specifies an HSS (IPv6) based on the user information, registers the user (Step S306), and downloads the user information from the HSS (IPv6) (Step S307).

The AS (IPv6) transmits a 200-OK signal indicating that the request has been successfully processed to the I-CSCF (IPv6) (Step S308). Subsequently, the I-CSCF (IPv6) transmits the received 200-OK signal to the IP converting unit 704 (Step S309). Then, the IP converting unit 704 transmits the received 200-OK signal to the P-CSCF (IPv4) (Step S310). Subsequently, the P-CSCF (IPv4) transmits the received 200-OK signal to the mobile phone 200 (Step S311).

The details of the process performed by each of the server apparatuses when the 3G device performs the outgoing call process will be explained below. FIG. 15 is a diagram illustrating a sequence of the outgoing call process for the 3G device. Specifically, FIG. 15 illustrates a sequence performed by the server apparatuses when the mobile phone 100, which is used by the user AA and which is compliant with only the 3G communication standard, performs the outgoing call process.

As illustrated in FIG. 15, the mobile phone 100 transmits, to the P-CSCF (IPv4), an INVITE signal in which a destination number is set (Step S401). The INVITE signal will be described below. FIG. 16 is a diagram for explaining an image of an SIP INVITE signal. As illustrated in FIG. 16, the INVITE signal defines, for example, a phone number of a connection destination, a connection domain, and the like.

Referring back to FIG. 15, the P-CSCF (IPv4) specifies an I-CSCF (IPv4) from the subscriber DB 528 (Step S402). For example, because the user AA is accommodated by the IPv4-based I-CSCF according to the subscriber DB 528 as illustrated in FIG. 6, the P-CSCF (IPv4) transmits the INVITE signal to the I-CSCF (IPv4) (Step S403).

Subsequently, the I-CSCF (IPv4) specifies the AS (IPv4) accommodating the user, and transmits the INVITE signal (Step S404). Then, the AS (IPv4) changes the state of the user AA from a free state to a calling state (Step S405). Subsequently, the AS (IPv4) performs routing to a connection destination based on the destination number. For example, the AS (IPv4) transmits the INVITE signal to the I-CSCF (IPv4) (Step S406), and the I-CSCF (IPv4) transmits the received INVITE signal to the connection destination (Step S407).

Subsequently, the connection destination transmits the 200-OK signal indicating that the request has been successfully processed to the I-CSCF (IPv4) (Step S408). The I-CSCF (IPv4) transmits the received 200-OK signal to the AS (IPv4) (Step S409).

Upon receiving the 200-OK signal transmitted by the connection destination, the AS (IPv4) changes the call state to a busy state (Step S410). Then, the AS (IPv4) transmits the 200-OK signal to the I-CSCF (IPv4) (Step S411).

Subsequently, the I-CSCF (IPv4) transmits the received 200-OK signal to the P-CSCF (IPv4) (Step S412). Then, the P-CSCF (IPv4) transmits the received 200-OK signal to the mobile phone 100 (Step S413).

The details of the process performed by each of the server apparatuses when the 3G/3.9G device performs a second outgoing call will be described below. FIG. 17 is a diagram illustrating a sequence of the second outgoing call for the 3G/3.9G device. Specifically, FIG. 17 illustrates a sequence performed by the server apparatuses when the mobile phone 200 used by a user AB performs a first outgoing call while being located in the 3.9G communication area, moves to the 3G communication area and performs handover (SRVCC) while keeping the busy state, and then performs a second outgoing call. Therefore, before a start of the sequence in FIG. 17, the same process sequence as illustrated in FIG. 16 has been performed in the IPv6 IMS network and the AS (IPv6) has changed a first call state of the mobile phone 200 to the busy state.

First, if the first call is placed on hold before the second call, the AS (IPv6) changes the first call state of the mobile phone 200 to an on-hold state (Step S501). Subsequently, the mobile phone 200 transmits the INVITE signal in which the destination number is set to the P-CSCF (IPv4) (Step S502).

The P-CSCF (IPv4) specifies an I-CSCF (IPv6) from the subscriber DB 528 (Step S503). For example, the P-CSCF (IPv4) specifies that the user AB is accommodated by the IPv6-based I-CSCF according to the subscriber DB 528 as illustrated in FIG. 6. Subsequently, the P-CSCF (IPv4) selects the IP converting unit 704 from the server address DB 547 as illustrated in FIG. 8, and transmits the INVITE signal, in which the I-CSCF (IPv6) is set as the route information, to the IP converting unit 704 (Step S504).

Then, the IP converting unit 704 transmits the received INVITE signal to the I-CSCF (IPv6) based on the set route information (Step S505). Subsequently, the I-CSCF (IPv6) specifies the AS (IPv6) accommodating the user, and transmits the INVITE signal (Step S506).

The AS (IPv6) recognizes that the call according to the received INVITE signal is a second call because the first call state of the user AB is the on-hold state, and changes a second call state from a free state to a calling state (Step S507). Subsequently, the AS (IPv6) performs routing to a connection destination based on the destination number. For example, the AS (IPv6) transmits the INVITE signal to the I-CSCF (IPv6) (Step S508). The I-CSCF (IPv6) transmits the received INVITE signal to the connection destination (Step S509).

Subsequently, the connection destination transmits the 200-OK signal indicating that the request has been successfully processed to the I-CSCF (IPv6) (Step S510). The I-CSCF (IPv6) transmits the received 200-OK signal to the AS (IPv6) (Step S511).

Upon receiving the 200-OK signal transmitted by the connection destination, the AS (IPv6) changes the second call state to a busy state (Step S512). Then, the AS (IPv6) transmits the 200-OK signal to the I-CSCF (IPv6) (Step S513).

Subsequently, the I-CSCF (IPv6) transmits the received 200-OK signal to the IP converting unit 704 (Step S514). Then, the IP converting unit 704 transmits the received 200-OK signal to the P-CSCF (IPv4) (Step S515). Subsequently, the P-CSCF (IPv4) transmits the received 200-OK signal to the mobile phone 200 (Step S516).

As described above, according to the server apparatus (the P-CSCF 540) of the embodiment, it becomes possible to centrally manage the call state of the mobile wireless device, with a simple structure. Specifically, according to the embodiment, the P-CSCF 540 deployed at the entrance of the IPv4 network that is an existing IMS network determines whether the mobile phone that has transmitted the location registration signal is a single device or a dual device. Subsequently, the P-CSCF 540 causes a download process of the user information and a call process to be performed by using the existing IMS network (IPv4) for an existing subscriber who has the single model and by using a new IMS network (IPv6) for a dual subscriber who has the dual model. Therefore, both of the call processes over the new network and the existing network can be performed by using the new IMS network (IPv6) for the dual subscriber who has the dual model, so that the call state can be managed centrally. For example, even when a dual device that has performed handover (SRVCC) from 3.9G to 3G makes a call, routing to the IPv6 IMS network is established and the state of the subscriber is determined, so that the call states for the 3G and the 3.9G can centrally be managed by the IPv6 IMS network. Therefore, the management of the call state is not distributed and a mechanism for sharing the call state between the IPv4 network and the IPv6 network is not needed, so that the process can be simplified. Furthermore, according to the embodiment, the impact on the existing IMS network is limited by minimum modifications to the process performed by the P-CSCF 540. Therefore, it becomes possible to centrally manage the call state of the mobile wireless device with a simple structure.

In the embodiment, the server apparatus (the P-CSCF 540) and the communication control method are mainly explained; however, the present invention is not limited to the embodiment. For example, it may be possible to cause a server apparatus (computer) to execute a communication control program prepared in advance to implement the same functions as those of the embodiment. Specifically, the communication control program causes the server apparatus to performs a process of determining whether a mobile wireless device that has transmitted a location registration signal is a model compliant with only a first communication standard or a model compliant with both of the first communication standard and a second communication standard, based on identification information, which is unique to the mobile wireless device and which is contained in a location registration signal transmitted by the mobile wireless device for registering location information on the mobile wireless device. Furthermore, when it is determined that the mobile wireless device that has transmitted the location registration signal is the model compliant with only the first communication standard, the communication control program causes the server apparatus to perform a process of causing a server configured to perform a process using a first Internet protocol to perform the location registration process based on the location registration signal. Moreover, when it is determined that the mobile wireless device that has transmitted the location registration signal is the model compliant with both of the first communication standard and the second communication standard, the communication control program causes the server apparatus to perform a process of causing a server configured to perform a process using a second Internet protocol to perform the location registration process based on the location registration signal. Incidentally, the communication control program may be distributed to the computer via a communication network, such as the Internet. Furthermore, the communication control program may be recorded in a memory or a hard disk provided in the server apparatus or may be recorded in other computer-readable recording media, and the computer may read the communication control program from the recording medium and execute the communication control program.

According to an embodiment of the server apparatus of the disclosed invention, it is possible to centrally manage the call state of a mobile wireless device with a simple structure.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A proxy server apparatus that performs processes using the Internet protocol version 4 (IPv4) addresses comprising:
   a memory; and
   a processor coupled to the memory, wherein the processor executes a process comprising:
   receiving a location registration signal from a mobile wireless device, the location registration signal containing identification information unique to the mobile wireless device and being transmitted to register location information on the mobile wireless device;
   determining whether the mobile wireless device transmitting the location registration signal is a first model compliant with only a first communication standard compatible with IPv4 or a second model compliant with both of the first communication standard and a second communication standard compatible with the Internet protocol version 6 (IPv6), based on the identification information contained in the received location registration signal; and
   selecting, from a first interrogating server configured to perform a process using IPv4 and a second interrogating server configured to perform a process using IPv6, which is not supported by the first interrogating server, the first interrogating server when the mobile wireless device transmitting the location registration signal is determined to be the first model, and selecting the second interrogating server when the mobile wireless device transmitting the location registration signal is determined to be the second model;
   causing the selected first interrogating server or the selected second interrogating server to perform a location registration process based on the location registration signal;
   upon receiving an INVITE signal from the mobile wireless device of the second model that has performed handover (SRVCC) from 3.9G to 3G while the first call is in a busy state, specifying the second interrogating server that performs the location registration process of the mobile wireless device of the second model; and
   transmitting an INVITE signal to the specified second interrogating server.

2. The proxy server apparatus according to claim 1, further comprising:
   a device information database that stores a plurality of pieces of identification information unique to mobile wireless devices and stores specification information in association with each of the pieces of the identification information, the specification information specifying whether each of the mobile wireless devices is the first model or the second model, wherein the determining determines whether the mobile wireless device transmitting the location registration signal is the first model or the second model based on the identification information contained in the location registration signal received by the receiving and based on the device information database.

3. The proxy server apparatus according to claim 1, wherein the first communication standard is a 3rd generation mobile communication standard, and the second communication standard is a 3.9th generation mobile communication standard.

4. The proxy server apparatus according to claim 1, wherein the proxy server apparatus is a proxy call session control function server, and when the determining determines that the mobile wireless device transmitting the location registration signal is the second model, the causing causes the second interrogating server to perform the location registration process based on the location registration signal.

5. A non-transitory computer-readable recording medium having stored therein a program for causing a proxy server apparatus that performs processes using the Internet protocol version 4 (IPv4) addresses to execute a communication control process comprising:
   determining whether a mobile wireless device transmitting a location registration signal is a first model compliant with only a first communication standard compatible with IPv4 or a second model compliant with both of the first communication standard and a second communication standard compatible with IPv6, based on identification information unique to the mobile wireless device, the identification information contained in the location registration signal transmitted by the mobile wireless device to register location information on the mobile wireless device;

selecting, from a first interrogating server configured to perform a process using IPv4 and a second interrogating server configured to perform a process using IPv6, which is not supported by the first interrogating server, the first interrogating server when the mobile wireless device transmitting the location registration signal is determined to be the first model, and selecting the second interrogating server when the mobile wireless device transmitting the location registration signal is determined to be the second model;

causing the selected first interrogating server or the selected second interrogating server to perform a location registration process based on the location registration signal;

upon receiving an INVITE signal from the mobile wireless device of the second model that has performed handover (SRVCC) from 3.9G to 3G while the first call is in a busy state, specifying the second interrogating server that performs the location registration process of the mobile wireless device of the second model; and transmitting an INVITE signal to the specified second interrogating server.

6. A communication control method comprising:

receiving a location registration signal from a mobile wireless device, the location registration signal containing identification information unique to the mobile wireless device and being transmitted to register location information on the mobile wireless device;

determining whether the mobile wireless device transmitting the location registration signal is a first model compliant with only a first communication standard compatible with IPv4 or a second model compliant with both of the first communication standard and a second communication standard compatible with IPv6, based on the identification information contained in the location registration signal received at the receiving;

selecting, from a first interrogating server configured to perform a process using IPv4 and a second interrogating server configured to perform a process using IPv6, which is not supported by the first interrogating server, the first interrogating server when the mobile wireless device transmitting the location registration signal is determined to be the first model, and selecting the second interrogating server when the mobile wireless device transmitting the location registration signal is determined to be the second model;

causing the selected first interrogating server or the selected second interrogating server to perform a location registration process based on the location registration signal;

upon receiving an INVITE signal from the mobile wireless device of the second model that has performed handover (SRVCC) from 3.9G to 3G while the first call is in a busy state, specifying the second interrogating server that performs the location registration process of the mobile wireless device of the second model; and transmitting an INVITE signal to the specified second interrogating server.

* * * * *